United States Patent
Ko et al.

(10) Patent No.: US 7,583,577 B2
(45) Date of Patent: Sep. 1, 2009

(54) SYSTEM AND METHOD FOR MEASURING VIBRATION CHARACTERISTICS OF OPTICAL DISK DRIVE

(75) Inventors: Yu-Cheng Ko, Guangdong (CN); Shuang-Quan Luo, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 461 days.

(21) Appl. No.: 11/309,456

(22) Filed: Aug. 10, 2006

(65) Prior Publication Data

US 2007/0153658 A1   Jul. 5, 2007

(30) Foreign Application Priority Data

Jan. 5, 2006   (CN) .................. 2006 1 0032771

(51) Int. Cl.
G11B 11/00   (2006.01)

(52) U.S. Cl. ................... 369/53.18; 369/53.42

(58) Field of Classification Search .............. None
See application file for complete search history.

(56) References Cited

U.S. PATENT DOCUMENTS

| 6,430,144 | B1 | 8/2002 | Liao et al. |
| 6,906,986 | B2 | 6/2005 | Lee et al. |
| 6,912,184 | B2 | 6/2005 | Lim et al. |
| 2002/0101807 | A1* | 8/2002 | Kang ............... 369/53.19 |

* cited by examiner

*Primary Examiner*—Paul Huber
(74) *Attorney, Agent, or Firm*—Winston Hsu

(57) ABSTRACT

A vibration measuring system is used for measuring vibration characteristics of an optical disk drive. The vibration measuring system includes a command setting unit, a command sending unit, and a signal receiving unit. The command setting unit is used for setting a measure command. The command sending unit is used for sending the measure command to the optical disk drive. The signal receiving unit is used for receiving a feedback signal from the optical disk drive, and extracting measured information on the vibration characteristics from the feedback signal. A vibration measuring method is also disclosed.

13 Claims, 5 Drawing Sheets

| Byte[0] | Byte[1] | Byte[2] | Byte[3] | Byte[4] | Byte[5] | Byte[6] | Byte[7] | Byte[8] | Byte[9] | Byte[10] | Byte[11] |
|---------|---------|---------|---------|---------|---------|---------|---------|---------|---------|----------|----------|
| 0 × 00  | 0 × 00  | 0 × 00  | 0 × 00  | 0 × 00  | 0 × 00  | 0 × 00  | 0 × 00  | 0 × 00  | 0 × 00  | 0 × 00   | 0 × 00   |

FIG. 2

SYSTEM AND METHOD FOR MEASURING VIBRATION CHARACTERISTICS OF OPTICAL DISK DRIVE

DESCRIPTION

1. Field of the Invention

The present invention generally relates to vibration measuring systems and vibration measuring methods, and more particularly to a system and a method for measuring vibration characteristics of an optical disk drive.

2. Description of Related Art

The development of optical storage technologies have made reading speeds of optical disk drives increased continuously. A reading speed of an optical disk drive is based on a rotational speed of a spindle motor. The quicker the spindle motor rotates, the faster the reading speed gets. However, when the spindle motor rotates at a high rotational speed, an increased eccentric swinging force of an optical disk may lead to vibrations of the optical disk drive. The vibrations generally results in noisy unsteady reading operations that make users feel uncomfortable.

Many methods have been proposed to suppress the vibrations. For example, in a first method, weights are attached to a traverse module of the optical disk drive to directly reduce the vibration, in a second method, dynamic absorbers are used to absorb the vibrations. However, before using these methods to suppress the vibrations, characteristics of the vibrations need to be measured on the optical disk drive.

A traditional measuring method attaches an accelerometer to the spindle motor. When the rotational speed of the spindle motor has a variance, the vibration of the optical disk drive generates a corresponding variance. The accelerometer detects the variance of the vibrations and generates an electric signal. A spectrum analyzer is used for analyzing the electric signal and displaying a corresponding graph to represent vibrations characteristics of the optical disk drive.

However, it is expensive to use the accelerometer and the spectrum analyzer to measure vibration characteristics of the optical disk drive.

Therefore, a vibration measuring system and a vibration measuring method for an optical disk drive are needed in the industry to address the aforementioned deficiencies and inadequacies.

SUMMARY OF THE INVENTION

A vibration measuring system is for measuring vibration characteristics of an optical disk drive. The vibration measuring system includes a command setting unit, a command sending unit, and a signal receiving unit. The command setting unit is used for setting a measure command. The command sending unit is used for sending the measure command to the optical disk drive. The signal receiving unit is used for receiving a feedback signal from the optical disk drive, and extracting measured information on the vibration characteristics from the feedback signal.

Other systems, methods, features, and advantages of the present vibration measuring system and method will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present vibration measuring system and vibration measuring method can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

FIG. 2 is a table illustrating a format of a 12 bytes small computer system interface;

DETAILED DESCRIPTION OF THE INVENTION

Reference will now be made to the drawings to describe a preferred embodiment of the present vibration measuring system and a preferred embodiment of the present vibration measuring method.

Figure 1:
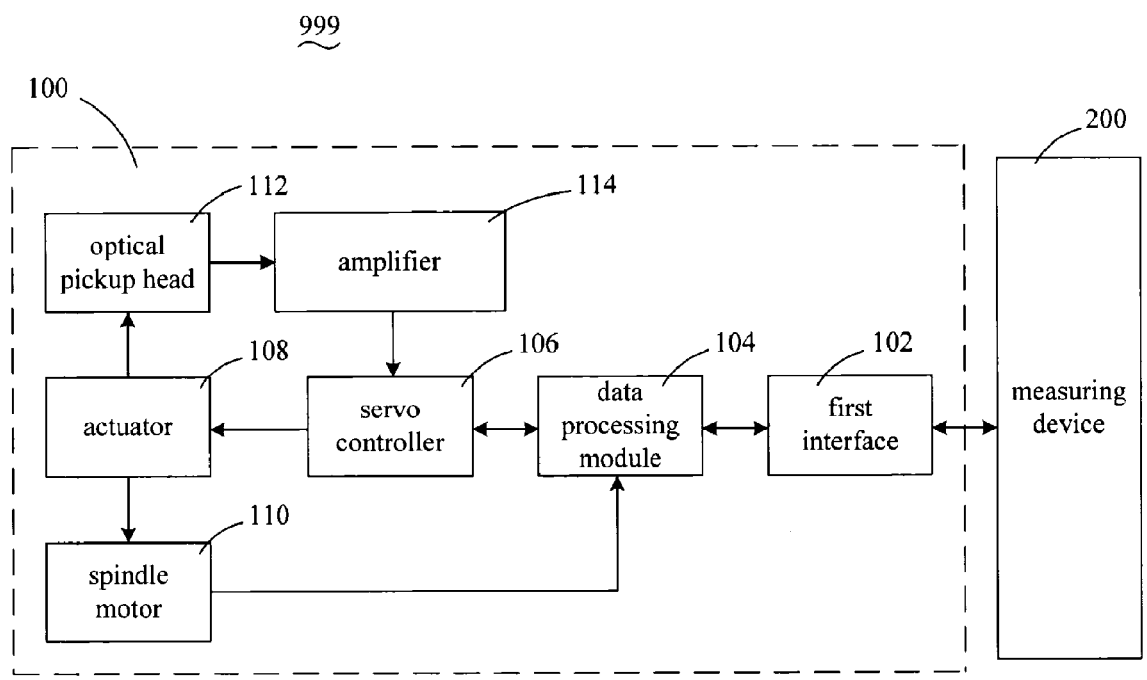
FIG. 1 is a block diagram illustrating a vibration measuring system for measuring vibration characteristics of an optical disk drive in accordance with an exemplary embodiment, the vibration measuring system including a measuring device.

Referring to FIG. 1, a vibration measuring system 999 in accordance with a preferred embodiment includes an optical disk drive 100 and a measuring device 200. The measuring device 200 sends a measure command to the optical disk drive 100 to measure vibration characteristics of the optical disk drive 100. The measure command specifies a rotational speed of the optical disk drive 100, a rotational speed variance of the optical disk drive 100, and an initial measure count. The optical disk drive 100 receives the measure command and executes according to the measure command. After measuring, the optical disk drive 100 sends a feedback signal to the measuring device 200. The feedback signal includes track numbers, an actual rotational speed, and present measure count.

Referring also to FIG. 2, in the preferred embodiment, the measure command and the feedback signal both adopt a 12 bytes small computer system interface (SCSI) data transfer format. Herein, Byte[1], Byte[9], Byte[10], and Byte[11] remain undefined. Byte[0] indicates an identifier of the measure command. Byte[2] and Byte[3] indicate the rotational speed variance. Byte[4] and Byte[5] indicate the track numbers. In the measure command, Byte[6] and Byte[7] indicate the rotational speed, and Byte[8] indicates the initial measure count. In the feedback signal, Byte[6] Byte[7] indicate the actual rotational speed, and Byte[8] indicates the present measure count. Byte[6], Byte[7], and Byte[8] are variable.

The optical disk drive 100 includes a first interface 102, a data processing module 104, a servo controller 106, an actuator 108, a spindle motor 110, an optical pickup head 112, and an amplifier 114.

The first interface 102 receives the measure command from the measuring device 200, and further sends the measure command to the data processing module 104. The data processing module 104 extracts the rotational speed from the measure command, and sends the rotational speed to the servo controller 106.

The servo controller 106 generates servo control commands for controlling a spindle motor servo, a tracking servo according to the rotational speed. The servo controller 106 sends the servo control commands to the actuator 108. The actuator 108 drives the spindle motor 110 to rotate, and further drives the optical pickup head 112 to perform tracking operations. The spindle motor 110 sends the actual rotational speed to the data processing module 104. The optical pickup head 112 reads information from an optical disk (not shown), and generates a reproducing output. The amplifier 114 amplifies the reproducing output. The servo controller 106 sends the amplified reproducing output to the data processing module 104.

The processing module 104 extracts the track numbers from the amplified reproducing output, and further generates the feedback signal according to the track numbers, the actual rotational speed, and the present measure count. The processing module 104 further sends the feedback signal to the first interface 102. After each measuring, the first interface 102 sends an indicating signal that a single measure is finished on the measuring device 200. After the measuring device 200 identifies the indicating signal, the first interface 102 sends the feedback signal to the measuring device 200.

Figure 3:
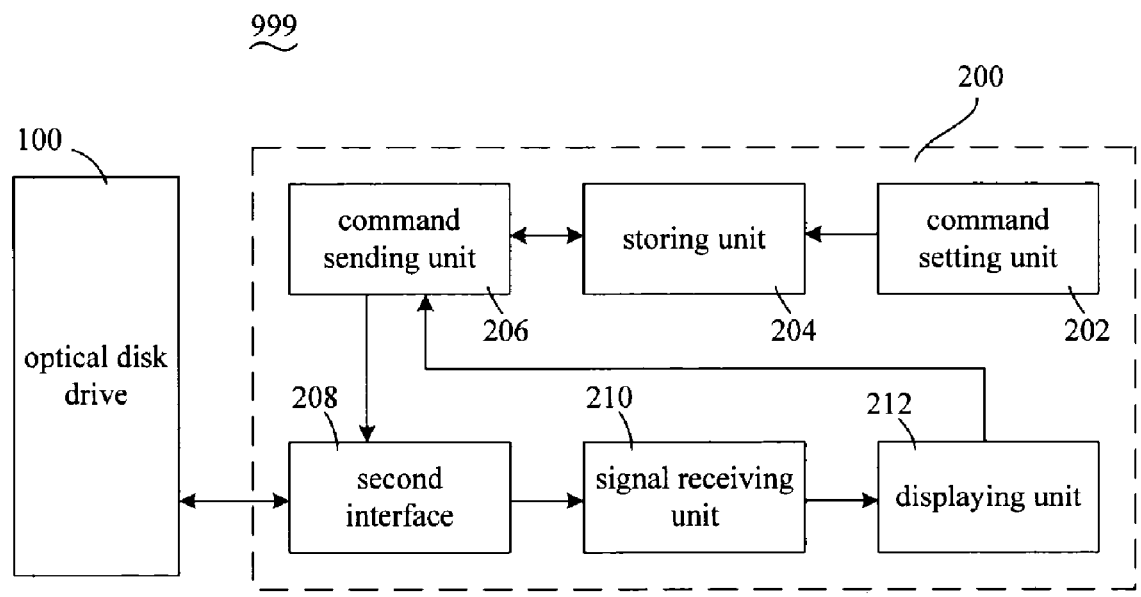
FIG. 3 is a block diagram illustrating the measuring device of FIG. 1.

Referring to FIG. 3, the measuring device 200 includes a command setting unit 202, a storing unit 204, a command sending unit 206, a second interface 208, a signal receiving unit 210, and a displaying unit 212.

The command setting unit 202 is used for setting the measure command including the identifier of the measure command, the rotational speed variance, the rotational speed, and the initial measure count.

The storing unit 204 is used for storing the measure command. The command sending unit 206 is used for reading and updating the measuring command stored in the storing unit 204, and sending the measuring command to the second interface 208. The rotational speed is updated in the measuring command. For instance, the rotational speed variance is set to be "a", and the rotational speed is set to be "b", and the initial measure count is set to be "n". When the present measure count equals to "m", the command sending unit 206 updates the rotational speed to be "b+m*a". If "m" is equal to "n", the command sending unit 206 stops sending measure commands.

The second interface 208 is used for sending the measure command to the optical disk drive 100. The second interface 208 is also used for receiving the indicating signal and sending a response to the first interface 102, and then receiving the feedback signal and sending the feedback signal to the signal receiving unit 210.

The signal receiving unit 210 is used for receiving the feedback signal, and for extracting measured information such as the track numbers, the actual rotational speed, and the present measure count from the feedback signal. The signal receiving unit 210 is also used for sending the measured information to the displaying unit 212. The displaying unit 212 is used for displaying a graph based on the measured information, and sending the present measure count to the command sending unit 206.

Figure 4:
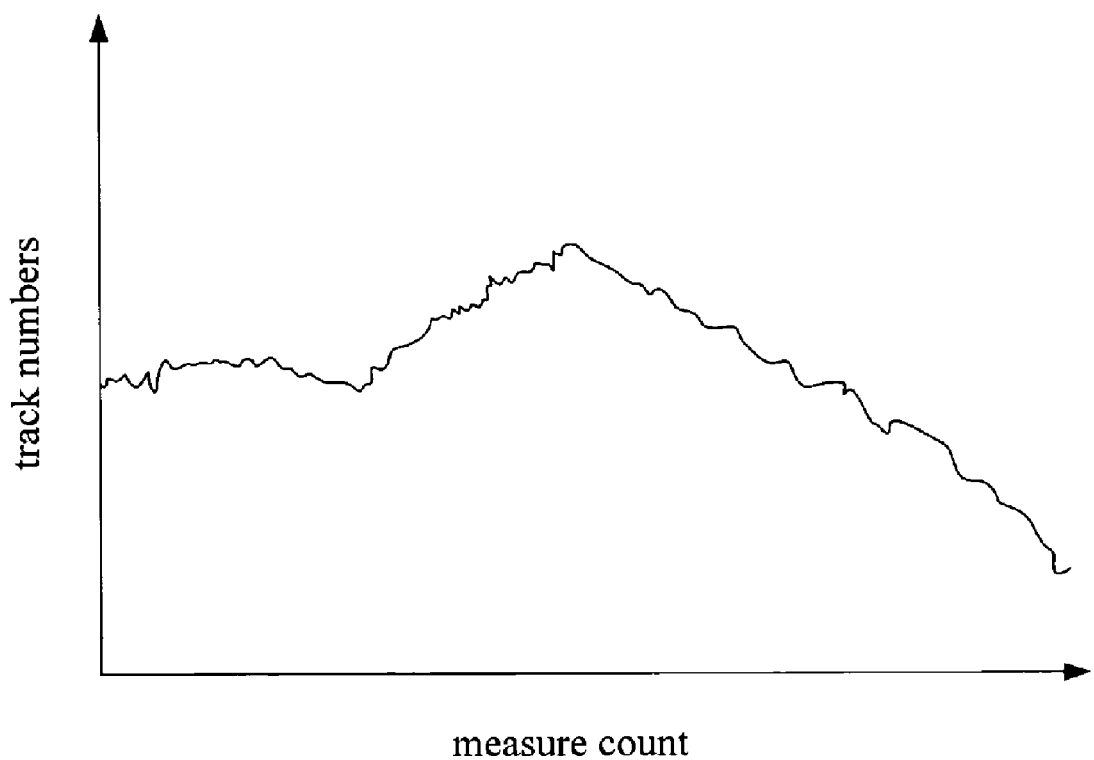
FIG. 4 is a graph illustrating the vibration characteristics of the optical disk drive.

Referring to FIG. 4, the graph illustrates the vibrations characteristics of the optical disk drive 100. An abscissa of the graph indicates the present measure count, and an ordinate of the graph indicates the track numbers. A peak of the graph indicates a maximum track numbers. The maximum track numbers represent the fiercest vibrations of the optical disk drive 100. That is, the optical disk drive 100 has the fiercest vibrations when it rotates at an actual rotational speed corresponding to the peak of the graph. Therefore, the vibrations characteristics of the optical disk drive 100 can be obtained based on the graph, and a corresponding method can be chosen to eliminate vibrations of the optical disk drive 100 according to the vibrations characteristics.

Because the vibration measuring system 999 does not include the accelerometer and the spectrum analyzer, it is cheaper to use the vibration measuring system 999 than the accelerometer to measure the vibration characteristics of the optical disk drive 100.

Figure 5:
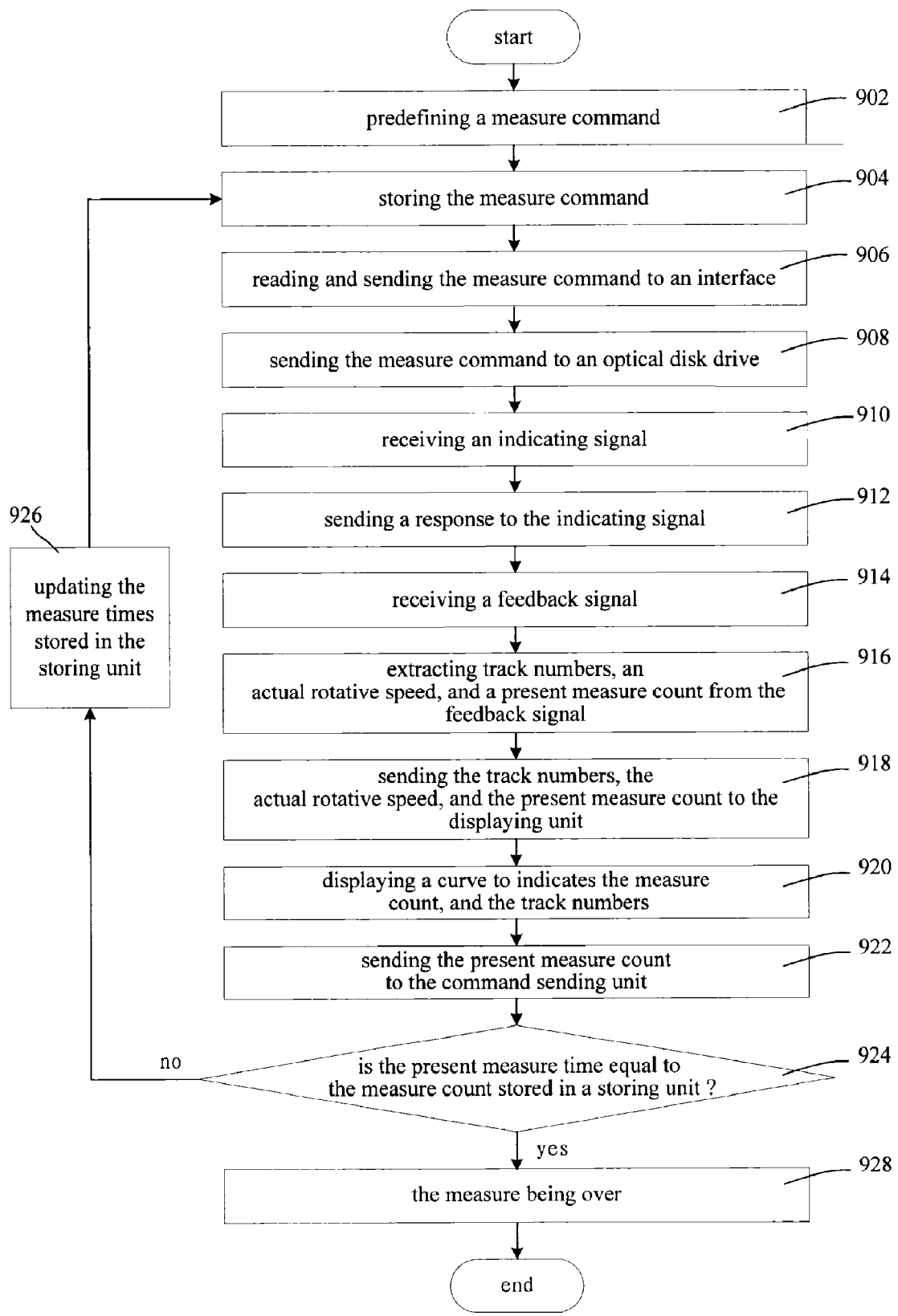
FIG. 5 is a process flow chart illustrating a vibration measuring method.

Referring to FIG. 5, a vibration measuring method is used for measuring the vibration characteristics of the optical disk drive 100. A procedure of the vibration measuring method includes following steps.

The command setting unit 202 predefines the identifier, the rotational speed variance, the rotational speed, the initial measure count specified in the measure command (step 902).

The storing unit 204 stores the measure command (step 904).

The command sending unit 206 reads the measure command, and sends the measure command to the second interface 208 (step 906).

The second interface 208 sends the measure command to the optical disk drive 100 (step 908).

The second interface 208 receives an indicating signal that a single measure is finished on the optical disk drive (step 910).

The second interface 208 sends a response to the indicating signal to the optical disk drive 100 (step 912).

The second interface 208 receives the feedback signal from the optical disk drive 100, and sends the feedback signal to the signal receiving unit 210 (step 914).

The signal receiving unit 210 receives the feedback signal, and extracts the track numbers, the actual rotational speed, and the present measure count from the feedback signal (step 916).

The signal receiving unit 210 sends the track numbers, the actual rotational speed, and the present measure count to the displaying unit 212 (step 918).

The displaying unit 212 displays a graph to indicates the initial measure count, and the track numbers (step 920).

The displaying unit 212 sends the present measure count to the command sending unit 206 (step 922).

The command sending unit 206 judges whether the present measure count is equal to the initial measure count stored in the storing unit 204 (step 924).

If the present measure count is not equal to the initial measure count stored in the storing unit 204, the command sending unit 206 updates the measuring command and the procedure goes to step 906 (step 926).

If the present measure count is equal to the initial measure count stored in the storing unit 204, the procedure is over (step 928).

It should be emphasized that the above-described preferred embodiment, is merely a possible example of implementation of the principles of the invention, and is merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and be protected by the following claims.

What is claimed is:

1. A vibration measuring system for measuring vibration characteristics of an optical disk drive, the vibration measuring system comprising:
   a command setting unit for setting a measure command;
   a command sending unit for sending the measure command to the optical disk drive which in turn sending back a feedback signal; and a signal receiving unit for receiving the feedback signal from the optical disk drive, and extracting measured information on the vibration characteristics from the feedback signal;

wherein the measure command uses a format of a 12 bytes small computer system interface, and the measure command comprises a first byte indicating an identifier of the measure command, a third byte and a fourth byte indicating a rotational speed variance, a seven byte and an eighth byte indicating a rotational speed, a ninth byte indicating an initial measure count.

2. The vibration measuring system according to claim 1, wherein the feedback signal uses a format of a 12 bytes small computer system interface, and the feedback signal comprises a fifth byte and a sixth byte indicating track numbers, a seventh byte and an eighth byte indicating an actual rotational speed, and a ninth byte indicating a present measure count.

3. The vibration measuring system according to claim 2, wherein the measuring device further comprises a displaying unit for receiving the measured information from the signal receiving unit, and displaying a graph of the measured information for illustrating the vibration characteristics.

4. The vibration measuring system according to claim 3, wherein the measuring device comprises a storing unit for storing the measure command.

5. The vibration measuring system according to claim 4, wherein the displaying unit is used for sending the present measure count to the command sending unit.

6. The vibration measuring system according to claim 3, wherein an abscissa of the graph indicates the present measure count, and an ordinate of the curve indicates the track numbers.

7. The vibration measuring system according to claim 6, wherein a peak of the graph indicates a maximum track numbers.

8. A vibration measuring method for measuring vibration characteristics of an optical disk drive, the vibration measuring method comprising steps of:

sending a measure command to the optical disk drive to control a motor of the optical disk drive to rotate;

receiving a feedback signal from the optical disk drive; and extracting measured information, which comprises track numbers and rotation speed of the motor, from the feedback signal;

wherein the measure command uses a format of a 12 bytes small computer system interface, and the measure command comprises a first byte indicating an identifier of the measure command, a third byte and a fourth byte indicating a rotational speed variance, a seven byte and an eighth byte indicating a rotational speed, a ninth byte indicating an initial measure count.

9. The vibration measuring method according to claim 8, further comprising a step of:

extracting a present measure count from the feedback signal.

10. The vibration measuring method according to claim 9, further comprising steps of:

judging whether the present measure count is equal to the initial measure count; and ending the measuring if the present measure count is equal to the initial measure count.

11. The vibration measuring method according to claim 10, further comprising a step of:

going to the sending step if the present measure count is not equal to the initial measure count.

12. The vibration measuring method according to claim 8, further comprising steps of:

displaying a graph based on the measured information;

making an abscissa of the graph indicate the present measure count; and making an ordinate of the graph indicate the track numbers.

13. The vibration measuring method according to claim 12, further comprising a step of:

showing a peak of the graph to indicate a maximum track numbers.

* * * * *